United States Patent
Emerling et al.

[11] Patent Number: 5,904,002
[45] Date of Patent: May 18, 1999

[54] MOTOR VEHICLE DOOR MODULE

[75] Inventors: David M. Emerling, West Bloomfield, Mich.; Steven J. Dimig, Plymouth, Wis.; Gerald O. Morrison, Birmingham, Mich.; Carter S. Cannon, Southfield, Mich.; Kimberly C. Leshan, Farmington Hills, Mich.

[73] Assignee: Lear Corporation, Southfield, Mich.

[21] Appl. No.: 08/799,199

[22] Filed: Feb. 13, 1997

Related U.S. Application Data

[60] Provisional application No. 60/018,783, May 31, 1996, and provisional application No. 60/023,929, Aug. 14, 1996.

[51] Int. Cl.$^6$ .................................................. B60J 5/04
[52] U.S. Cl. .................................................. 49/502; 49/503
[58] Field of Search ................... 49/502, 503; 16/146.5, 16/146.6, 146.7

[56] References Cited

U.S. PATENT DOCUMENTS

| | | | |
|---|---|---|---|
| 4,306,381 | 12/1981 | Presto | 49/502 |
| 4,648,208 | 3/1987 | Baldamus et al. | 49/502 |
| 4,866,883 | 9/1989 | Brown et al. | 49/502 |
| 4,882,842 | 11/1989 | Basson et al. | 29/857 |
| 4,908,988 | 3/1990 | Yamamura et al. | 49/352 |
| 4,917,433 | 4/1990 | Tomforde | 296/146 |
| 4,920,697 | 5/1990 | Vail et al. | 49/348 |
| 4,924,630 | 5/1990 | Lomasney et al. | 49/502 |
| 4,934,099 | 6/1990 | Maekawa et al. | 49/352 |
| 4,941,258 | 7/1990 | Wright | 29/858 |
| 4,943,109 | 7/1990 | Skrbina et al. | 296/146 |
| 4,964,630 | 10/1990 | Curtiss | 272/93 |
| 4,969,680 | 11/1990 | Shimoda | 296/146 |
| 4,974,363 | 12/1990 | Reaney | 49/374 |
| 4,974,365 | 12/1990 | Ono | 49/502 |
| 4,984,389 | 1/1991 | Benoit et al. | 49/502 |
| 4,986,029 | 1/1991 | Richter | 49/349 |
| 4,991,351 | 2/1991 | Bertolini | 49/351 |
| 5,033,236 | 7/1991 | Szerdahelyi et al. | 49/502 |
| 5,040,334 | 8/1991 | Dossin et al. | 49/502 |
| 5,048,234 | 9/1991 | Lau et al. | 49/502 |
| 5,050,350 | 9/1991 | Bertolini et al. | 49/502 |
| 5,050,351 | 9/1991 | Goldbach et al. | 49/502 |
| 5,056,264 | 10/1991 | Jewell, II et al. | 49/502 |
| 5,060,711 | 10/1991 | Fimbell, III | 160/229.1 |
| 5,067,281 | 11/1991 | Dupuy | 49/502 |
| 5,083,832 | 1/1992 | Ohya | 296/146 |
| 5,090,158 | 2/1992 | Bertolini | 49/348 |
| 5,092,647 | 3/1992 | Ueda et al. | 49/502 |
| 5,094,034 | 3/1992 | Freeman | 49/502 |
| 5,095,655 | 3/1992 | Warren | 49/502 |
| 5,095,659 | 3/1992 | Benoit et al. | 49/502 |
| 5,111,620 | 5/1992 | Lau et al. | 49/502 |
| 5,127,191 | 7/1992 | Ohta | 49/62 |
| 5,163,248 | 11/1992 | Bielis et al. | 49/441 |
| 5,169,204 | 12/1992 | Kelman | 296/146 D |

(List continued on next page.)

FOREIGN PATENT DOCUMENTS

| | | |
|---|---|---|
| 495712 | 7/1992 | European Pat. Off. ............ 49/502 |
| 0712746 A1 | 5/1996 | European Pat. Off. . |
| 3402135 | 7/1985 | Germany .......................... 49/502 |
| 29607664U1 | 8/1996 | Germany . |
| WO 92/05011 | 4/1992 | WIPO . |
| WO 94/03341 | 2/1994 | WIPO . |
| WO 96/28314 | 9/1996 | WIPO . |
| 5,180,004 | 1/1993 | Nguyen ............................. 165/140 |
| 5,226,259 | 7/1993 | Yamagata et al. ................. 49/502 |
| 5,233,758 | 8/1993 | Bielis et al. ...................... 29/897.2 |

*Primary Examiner*—Daniel P. Stodola
*Assistant Examiner*—Curtis A. Cohen
*Attorney, Agent, or Firm*—Brooks & Kushman P.C.

[57] ABSTRACT

A door assembly for a motor vehicle. The door assembly comprises a molded door panel having a first side and a second side. The first side of the door panel is adapted to face into a passenger compartment of the motor vehicle. The second side of the door panel supports a belt line reinforcement, a lock and catch assembly, and a window lift assembly. The door assembly is adapted for joining with a door exterior.

13 Claims, 18 Drawing Sheets

U.S. PATENT DOCUMENTS

| | | | |
|---|---|---|---|
| 5,233,790 | 8/1993 | Bosotti et al. | 49/502 |
| 5,234,237 | 8/1993 | Gergoe et al. | 292/201 |
| 5,308,129 | 5/1994 | Hlavaty | 292/216 |
| 5,308,138 | 5/1994 | Hlavaty | 296/146.6 |
| 5,325,632 | 7/1994 | Djavairian et al. | 49/502 |
| 5,351,443 | 10/1994 | Kimura et al. | 49/502 |
| 5,355,629 | 10/1994 | Kimura et al. | 49/502 |
| 5,379,553 | 1/1995 | Kimura et al. | 49/502 |
| 5,386,674 | 2/1995 | Sfirakis et al. | 52/243.1 |
| 5,398,453 | 3/1995 | Heim et al. | 49/502 |
| 5,408,785 | 4/1995 | Heim et al. | 49/502 |
| 5,417,470 | 5/1995 | Holt | 296/188 |
| 5,446,999 | 9/1995 | Inaba et al. | 49/502 |
| 5,469,662 | 11/1995 | TenBrink et al. | 49/352 |
| 5,469,668 | 11/1995 | Heim et al. | 49/502 |
| 5,484,221 | 1/1996 | DeCoux | 403/203 |
| 5,505,024 | 4/1996 | DeRees et al. | 49/503 |
| 5,536,060 | 7/1996 | Rashid et al. | 49/502 |
| 5,548,930 | 8/1996 | Morando . | |
| 5,555,677 | 9/1996 | DeRees et al. | 49/502 |
| 5,570,922 | 11/1996 | DeRees et al. | 296/146.6 |
| 5,573,297 | 11/1996 | DeRees et al. | 296/146.6 |
| 5,580,119 | 12/1996 | Uchida et al. | 49/502 |
| 5,584,144 | 12/1996 | Hisano | 49/502 |
| 5,595,415 | 1/1997 | Beaulat | 49/502 |
| 5,617,676 | 4/1997 | Kleefeldt et al. | 49/502 |
| 5,623,785 | 4/1997 | Mariel | 49/352 |
| 5,667,868 | 9/1997 | Freeman | 49/502 |
| 5,762,394 | 6/1998 | Salmonowicz . | |
| 5,802,770 | 9/1998 | Kavanagh et al. | 49/506 |

MOTOR VEHICLE DOOR MODULE

This patent is entitled to the benefit of earlier filed U.S. Provisional patent application No. 60/018,783, filed May 31, 1996 U.S. Provisional patent application No. 60/023,929, filed Aug. 14, 1996 and U.S. patent application Ser. No. 08/739,681, filed Oct. 19, 1996.

TECHNICAL FIELD

This invention relates to automotive doors, and more particularly to a modular motor vehicle door assembly.

BACKGROUND ART

Automotive doors normally include sheet metal inner and outer door panels, an interior trim panel which faces into the passenger compartment, and various hardware situated between the panels. Conventionally, these components of the door have been assembled at the same time and place. To decrease the time and complexity of assembling the entire door, recent proposals have been made to construct some of the hardware as a unitary subassembly. This subassembly can then be joined with the remainder of the door at any given place and time.

U.S. Pat. No. 5,355,629 to Kimura et al., for example, shows a door for a vehicle that is assembled by joining three modules together to facilitate the assembly process. U.S. Pat. No. 4,648,208 to Baldamus et al. shows an automobile door with a unit carrier on which built-in units, especially a complete window winder with window pane, can be preassembled. U.S. Pat. No. 4,882,842 to Basson et al. shows a modular trim panel unit with the preassembly of the interior trim panel for the door including one or more basic mechanical and/or electrical components.

However, it has remained a goal to develop a design which decreases the time and complexity of the automotive door assembly process.

SUMMARY OF THE INVENTION

The present invention is a door assembly for a motor vehicle. The door assembly comprises a molded door panel having a first side and a second side. The first side of the door panel is adapted to face into a passenger compartment of the motor vehicle. The second side of the door panel supports a belt line reinforcement, a lock and catch assembly, and a window lift assembly. The door assembly of the present invention is adapted for joining with a door exterior.

Accordingly, it is an object of the present invention to provide a door assembly of the type described above which is formed of molded plastic.

Another object of the present invention is to provide a door assembly of the type described above which simplifies the automotive door assembly process.

Still another object of the present invention is to provide a door assembly of the type described above in which the electrical components can be tested prior to assembly with a door outer panel.

These and other objects, features, and advantages of the present invention are readily apparent from the following detailed description of the best mode for carrying out the invention when taken in conjunction with the accompanying drawings.

BEST MODE FOR CARRYING OUT THE INVENTION

Figure 1:
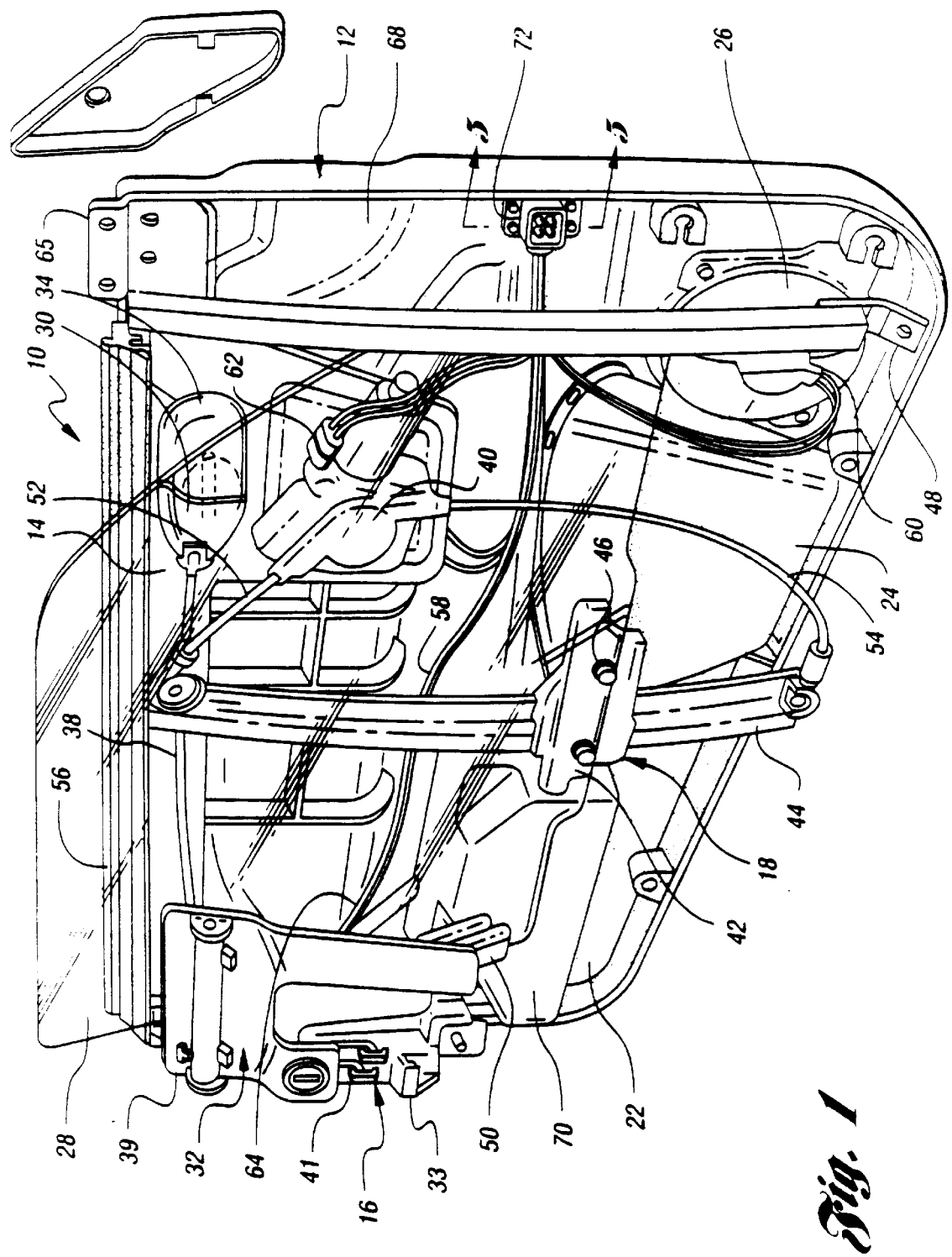
FIG. 1 is a perspective view of a door assembly according to the present invention for the right hand side of a motor vehicle.
Figure 2:
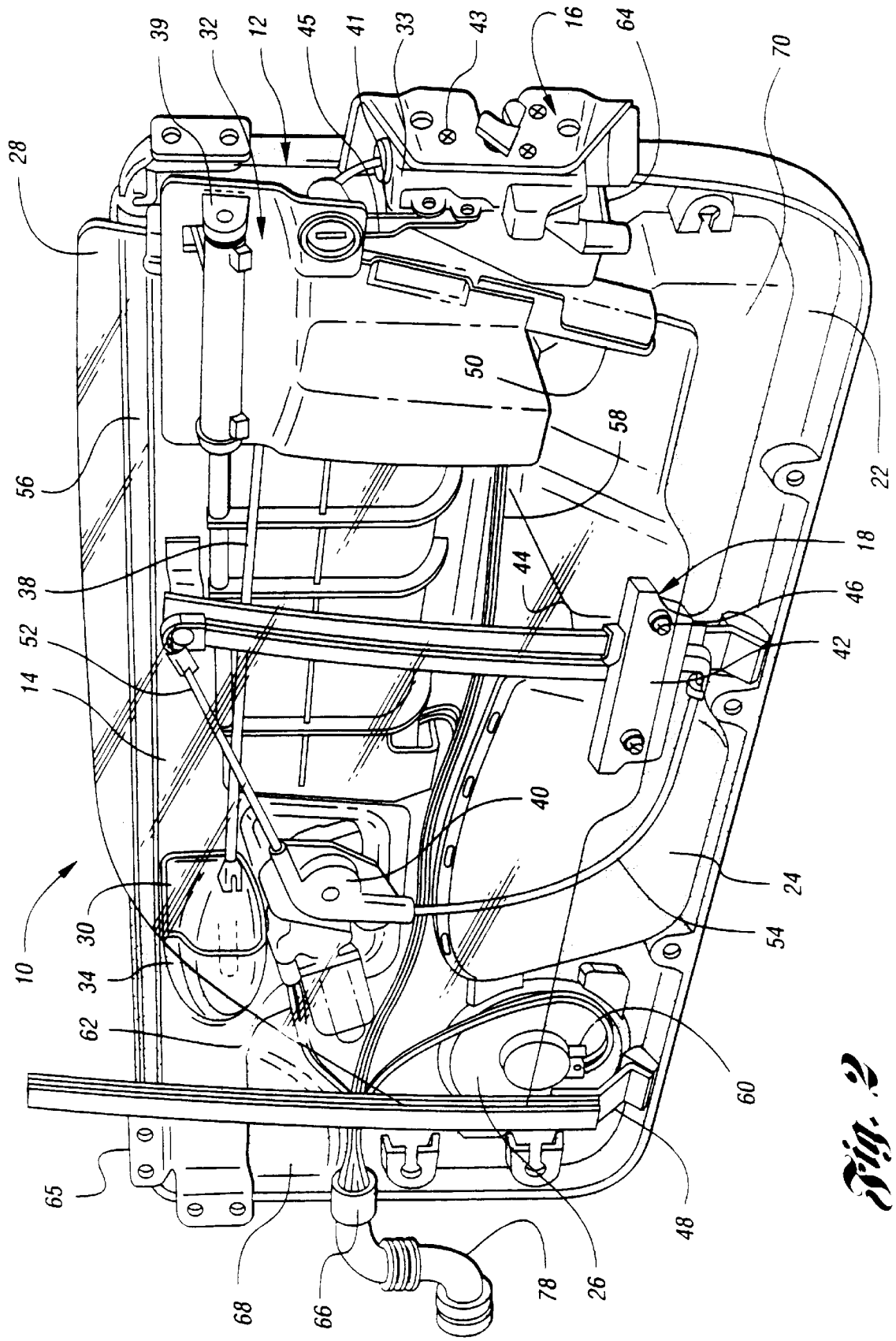
FIG. 2 is a perspective view of an alternative embodiment of the door assembly for the left hand side of the motor vehicle.

With reference to the drawings, the preferred embodiments of the present invention will be described. FIGS. 1 and 2 show a door assembly 10 according to the present invention for a motor vehicle. The door assembly 10 comprises a base door trim panel or substrate 12, a belt line reinforcement 14, a lock and catch assembly 16, and a window lift assembly 18. The base door panel 12 is preferably a unitary, injection molded piece comprising an olephenic thermoplastic such as polypropylene which is relatively rigid after curing, an engineered acrylonitrile-butadiene-styrene (ABS), or a glass-reinforced composite.

The base door panel 12 has a first or front side and a second or back side 22. The front side is adapted to face into a passenger compartment of the motor vehicle, and may include as attachments or integral parts thereof an arm rest, a bolster, a map pocket 24, a cloth applique or other trim finish, any lights or reflectors, power switch controls, a speaker compartment 26 and a speaker grill, and an aesthetic carpet.

Figure 3:
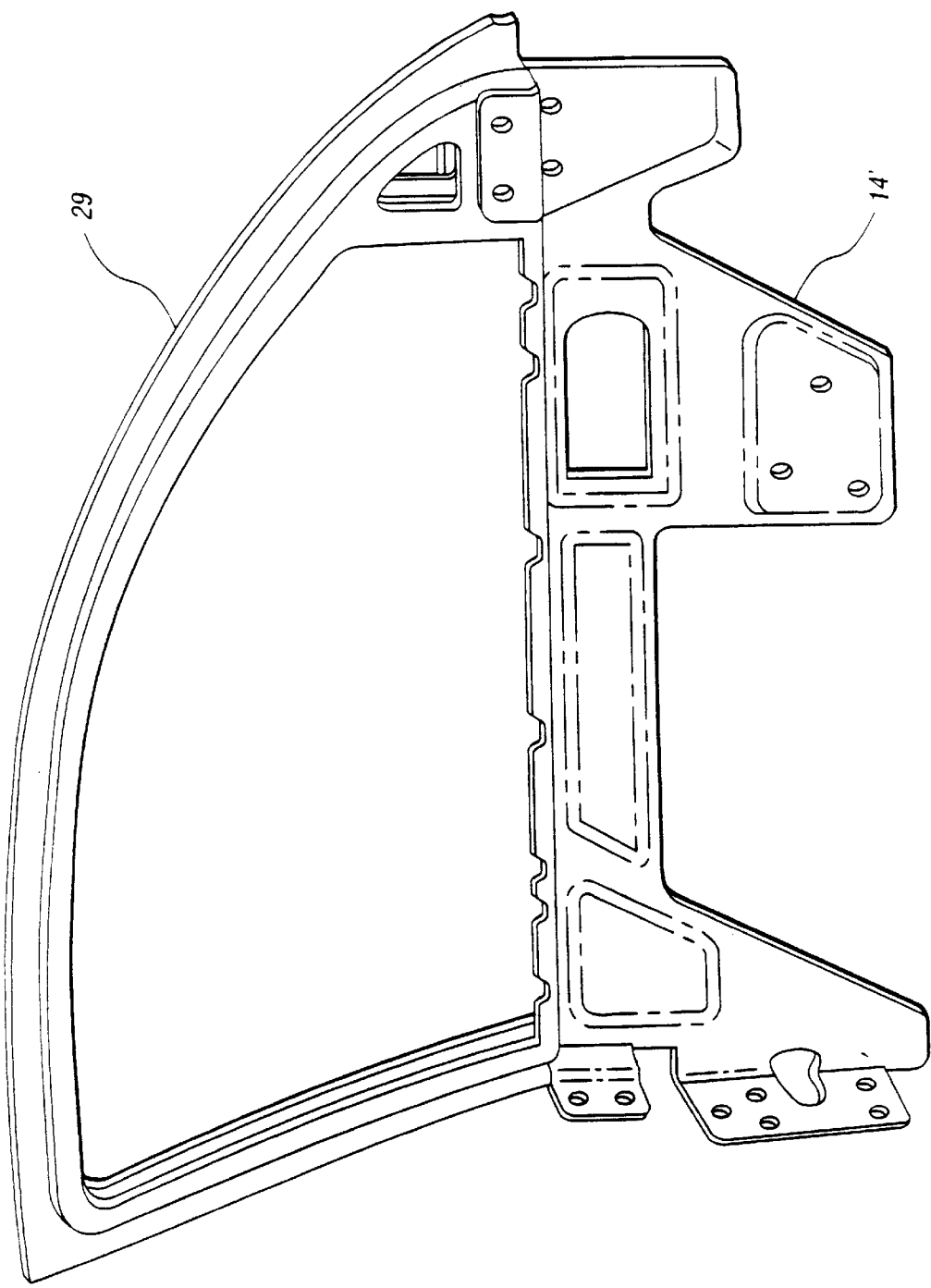
FIG. 3 is a perspective view of a belt line reinforcement and door window frame subassembly.
Figure 4:
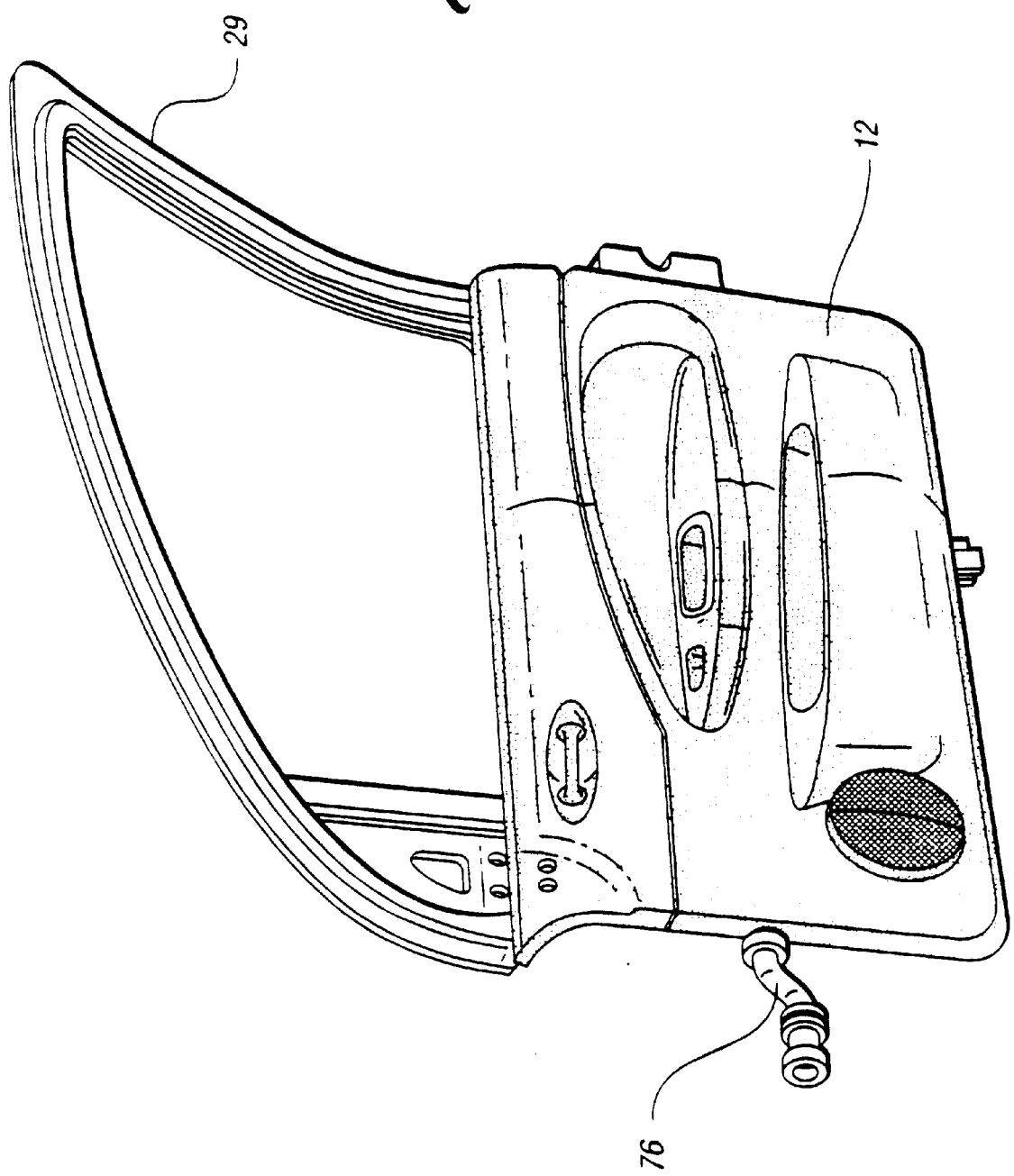
FIG. 4 is a perspective view of the belt line reinforcement and door window frame subassembly connected to the door assembly.

The belt line reinforcement 14 provides increased structural rigidity to the door panel 12, and in particular provides a structure against which a side window glass 28 can be loaded, a function normally provided by the same structure which is conventionally part of the door inner. The belt line reinforcement 14 may either be formed integrally with the door panel 12, or separately formed as a metal stamping or casting for attachment to the back side 22 of the door panel. In the latter case, the belt line reinforcement preferably comprises steel, magnesium, an engineered plastic or any other material with sufficient structural properties. FIG. 3 shows another alternative embodiment in which the belt line reinforcement 14' is integrally formed with or welded to a window frame or header 29, while FIG. 4 shows the belt line reinforcement and window frame subassembly attached to the door panel 12.

The lock and catch assembly 16 includes a door inner handle 30, a lock assembly 32 and a catch assembly 33. The door inner handle 30 slides into place within a door handle housing 34 formed in the door panel 12 or separately provided and attached to the door panel. A metal bracket attaches an exterior handle assembly 39 to the door panel 12. The catch assembly 33 is secured to the door panel, preferably with three fasteners such as screws 43. Lock release rod 41 extends between the keyhole of the lock assembly 32 and the catch assembly 33, while lock release rod 45 extends between the lock assembly and the exterior handle assembly 39. A cable 38 connects the door inner handle 30 to the lock assembly 32, as is well known. The lock and catch assembly 16 uniquely combines anti-theft, lock mounting and glass edge guides functions into one unit.

Figure 14:
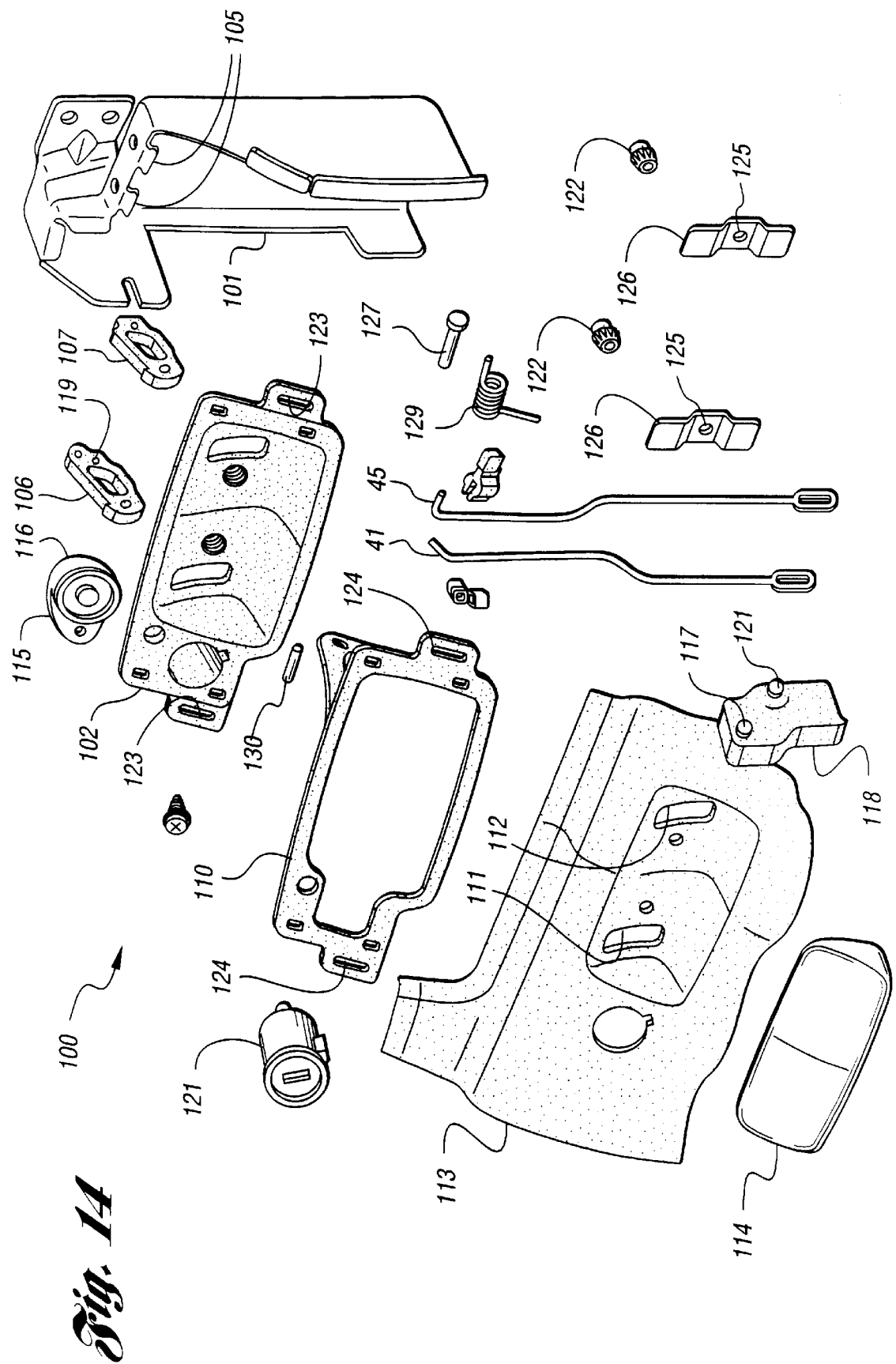
FIG. 14 is an exploded perspective view of an exterior lock and handle assembly.
Figure 15:
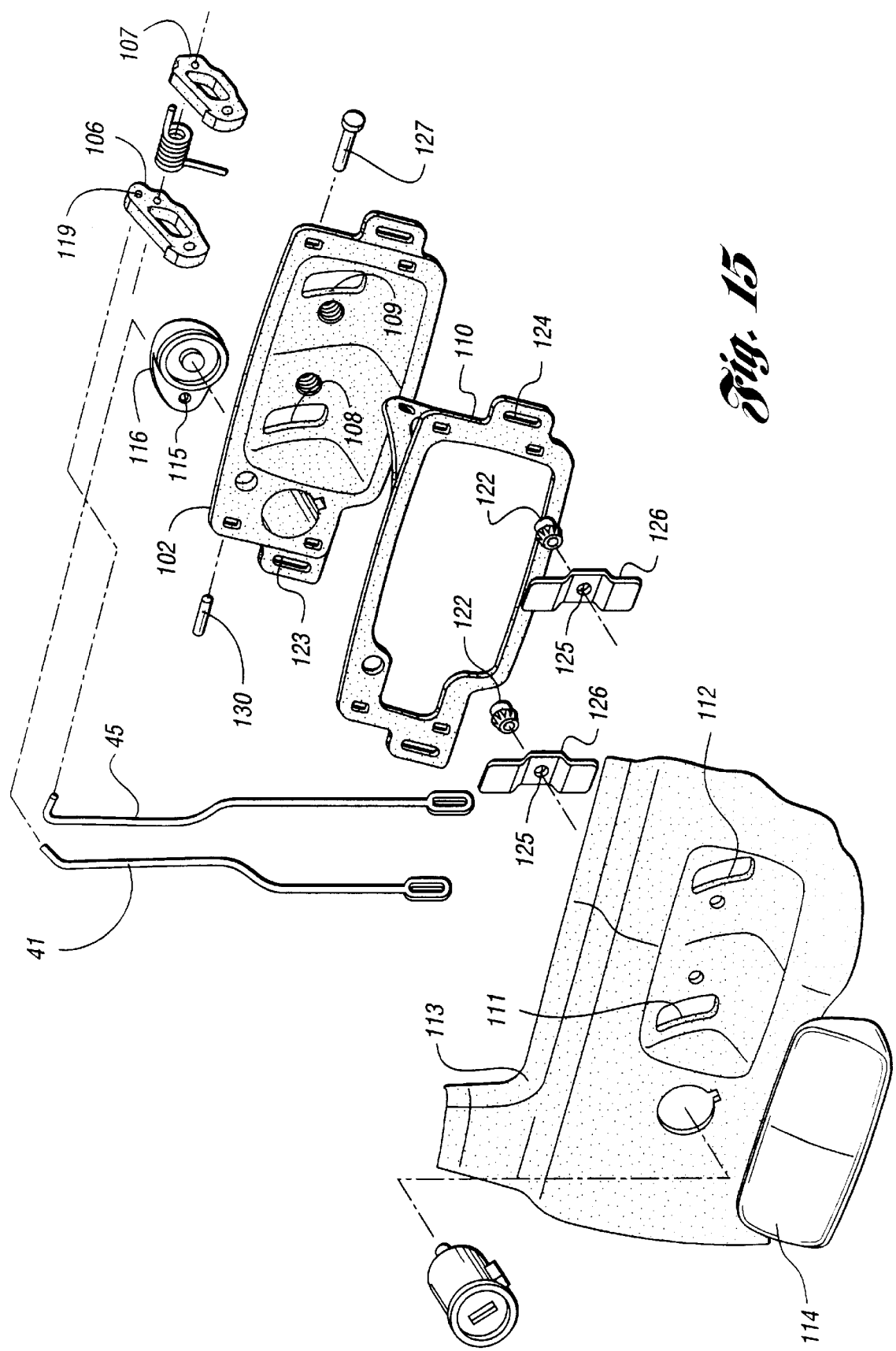
FIG. 15 is an exploded rear perspective view of the exterior lock and handle assembly.
Figure 16:
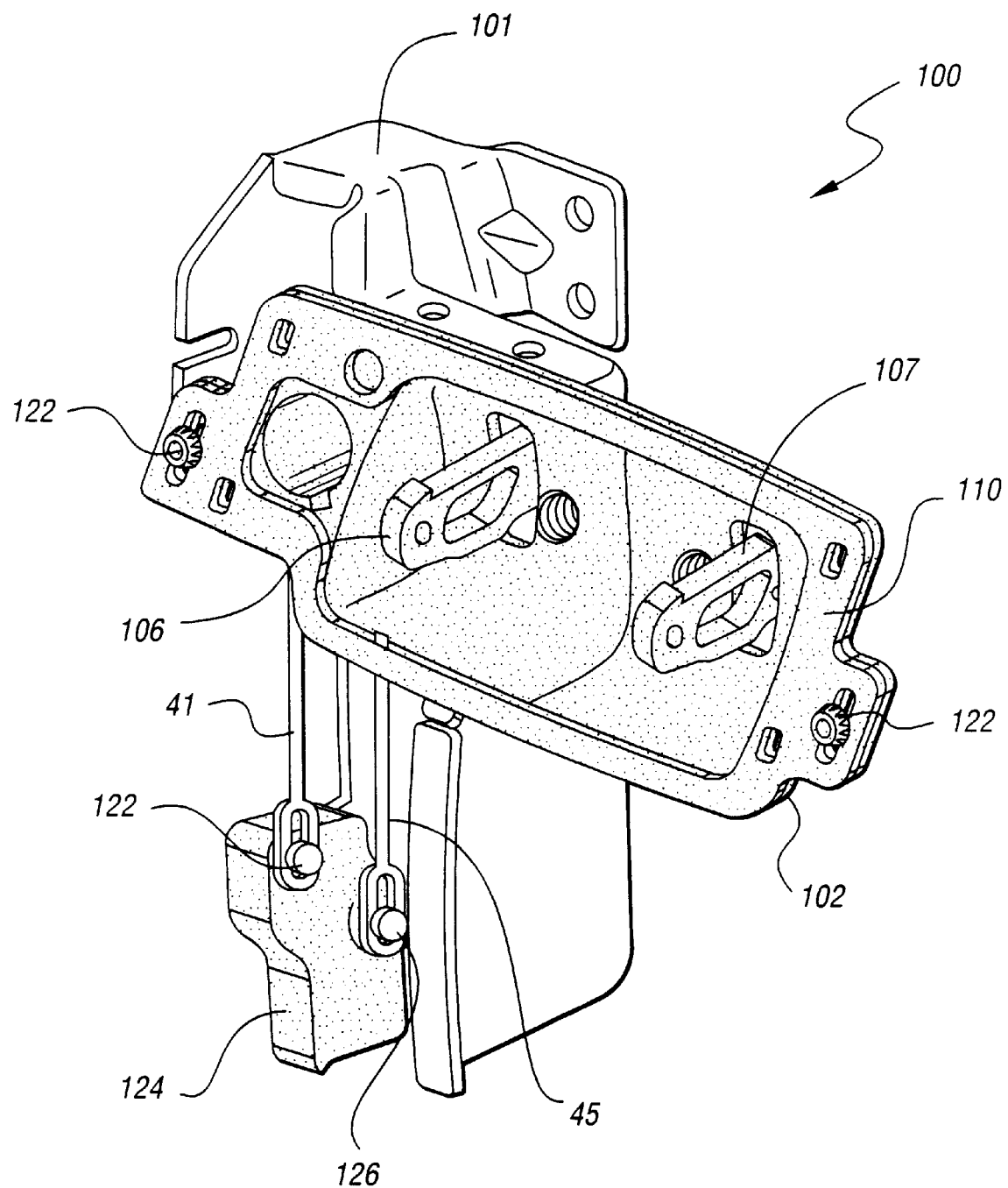
FIG. 16 is a perspective view of the mostly assembled exterior lock and handle assembly.

FIGS. 14–16 show an alternative embodiment 100 of the lock and exterior handle assembly. The assembly 100 includes an alternative embodiment 101 of the metal mounting bracket which attaches the assembly to the belt line reinforcement. Unlike its counterpart shown in FIGS. 1 and 2, the bracket 101 does not include glass run guides as described below. A cover or carrier 102 has a flange 103 with holes 104 that engage, preferably by snap fit, projections 105 on the bracket 101. Arms 106 and 107 respectively extend through vertical slots 108 and 109 in the carrier 102, through an adhesive-backed seal 110 provided on the carrier, and out through slots 111 and 112 in a sheet metal door outer 113 for snap fit attachment to exterior handle 114. To secure the arms 106 and 107, pin 127 extends through projections 128 on the rear side of the carrier, through a hole in the arm 106, through spring 129 and a holes in the arm 107, and mates with a pin 130.

Lock release rod 41 is attached at its upper end to hole 115 in a lock cam 116, and at its lower end is attached to a projection 117 on door latch 118. Similarly, lock release rod 45 is attached at its upper end to a hole 119 in arm 106, and is attached at its lower end to projection 121 on the door latch 118. Fasteners 122 extend through respective slots 123 and 124 in the carrier 102 and seal 110 to secure the unit 100 as a subassembly, and snap into holes or slots 125 in doghouse brackets 126 attached to the outer panel 113 to secure the unit 100 to the outer panel. After the trim panel 12 is attached to the outer panel, the handle 114 is snapped onto arms 106 and 107, and a lock cylinder 127 inserted through corresponding holes in the door outer 113 and the carrier 102, and into engagement with the lock cam 116.

Referring again to FIGS. 1 and 2, the window lift assembly 18 includes a motor 40, a generally horizontally oriented regulator 42, and a generally vertically oriented guide member 44 for the window regulator. The motor 40 is attached to the door panel 12, preferably by snap fit, and the window glass 28 is secured into a groove in the regulator 42 by one or more fasteners 46. The window glass 28 is supported by glass run channels or edge guides 48 and 50, each of which includes a weather seal. The guides 48 and 50 are either integrally molded with the door panel 12, or formed as separate metal or plastic pieces and fastened at their lower ends to the door panel 12 or to an extension of the belt line reinforcement, and at their upper ends to the belt line reinforcement 14. It should be understood, of course, that a motor is not required for manual operation of the window glass.

The regulator 42 thereafter moves the window glass up or down when the motor 40 alternately draws cables 52 and 54. A belt line glass seal or sweep 56 attached to a flange on the belt line reinforcement 14 generally adjacent the top of the door panel 12 provides an additional weather seal. A water management sheet 68, preferably formed of plastic such as polyethylene, polyurethane or a closed cell foam, inhibits the introduction of water, noise and dust from the interior of the door into the passenger compartment.

Figure 18:
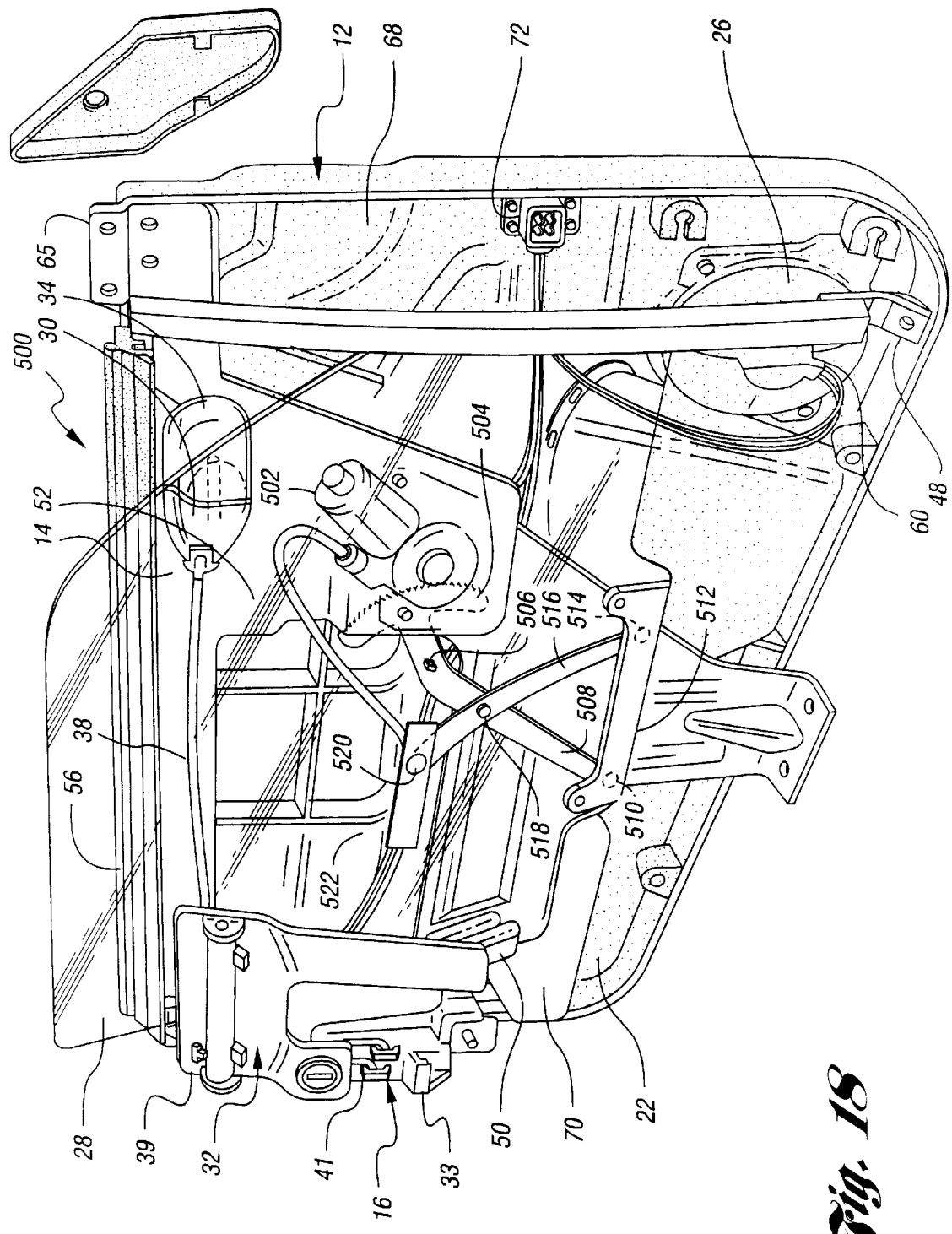
FIG. 18 is a perspective view of another alternative embodiment of the door assembly.

FIG. 18 shows an embodiment 500 of the door assembly including a scissors-type or arm-and-sector window lift assembly. A window lift motor 502 has a right angle drive which drives a toothed member 504 either clockwise or counterclockwise about a pivot point 506. The toothed member 504 is fastened to or integral with an extension 508, which at its distal end includes a roller 510. The roller 510 rides in a track in a regulator 512 fastened to the bottom of the window. A similar roller 514 also rides in the regulator track, and is connected to a cross member 516 pivotally connected at 518 to the extension 508. The opposite end of the cross member 516 includes a roller 520 that rides in a stationary horizontal track 522. The track 522 may be fixed to the door panel, formed as an extension of the assembly that includes the motor 502, or fastened at its opposite ends to the belt line reinforcement. As the motor 502 drives the toothed member 504 clockwise, the regulator 512 ascends and the window 28 is raised. As the toothed member 504 turns counterclockwise, the regulator descends and the window is lowered.

Figure 19:
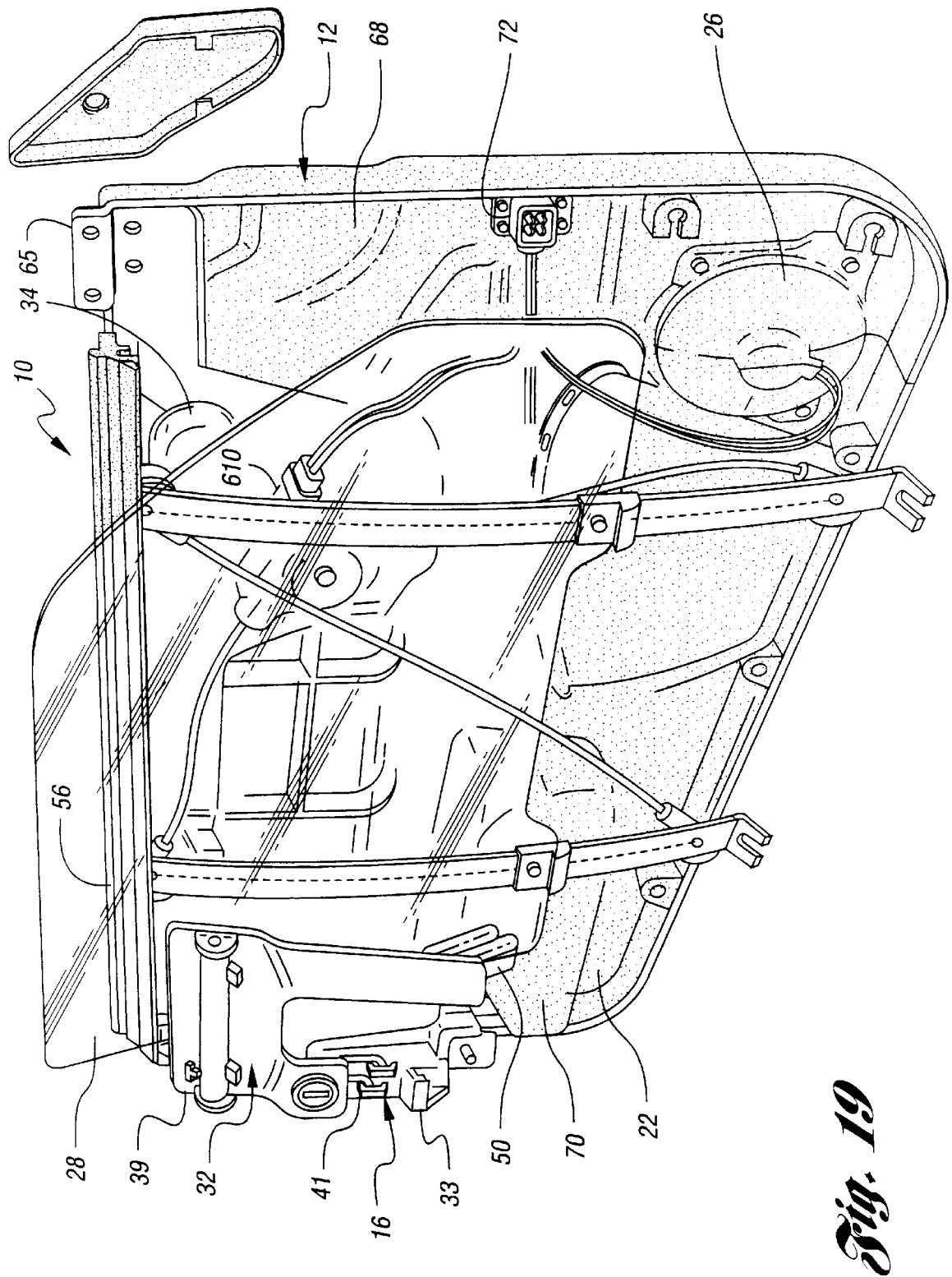
FIG. 19 is a perspective view of still another alternative embodiment of the door assembly.

FIG. 19 shows an embodiment 600 of the door assembly including a dual regulator window lift assembly. Two spaced apart regulators 602 and 604 ride on guide members 606 and 608, and engage the bottom of the window 28. A window lift motor 610 draws a continuous cable 614 in opposite directions to respectively move the regulators 602 and 604 and the window up or down along the guides 606 and 608.

A wiring harness 58 carries electrical current to all necessary components, and includes plug-in connectors such as speaker connector 60, regulator connector 62, power lock connector 64, and connectors for any power mirror connected to flange 65. The harness 58 is attached to the door panel 12 as necessary, preferably by positioning some or all of its length within channels or hooks molded into the door panel or the belt line reinforcement. Door side impact components, such as a foam block 70 or an air bag, may also be secured to the door panel 12.

Figure 5:
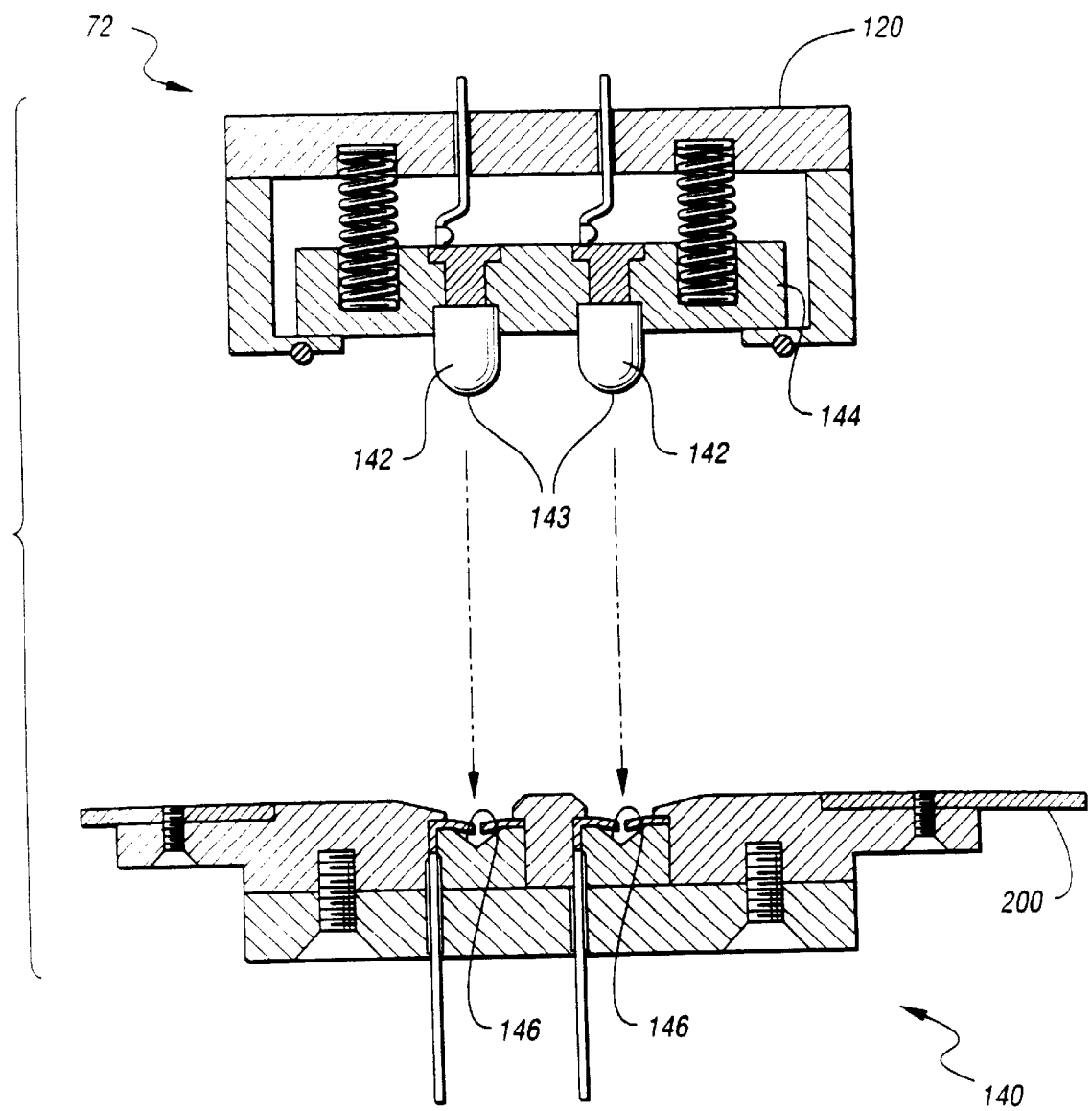
FIG. 5 is a cross-sectional view taken along line 5—5 in FIG. 1 of a self-aligning, self-docking electrical connection of the door assembly.
Figure 6:
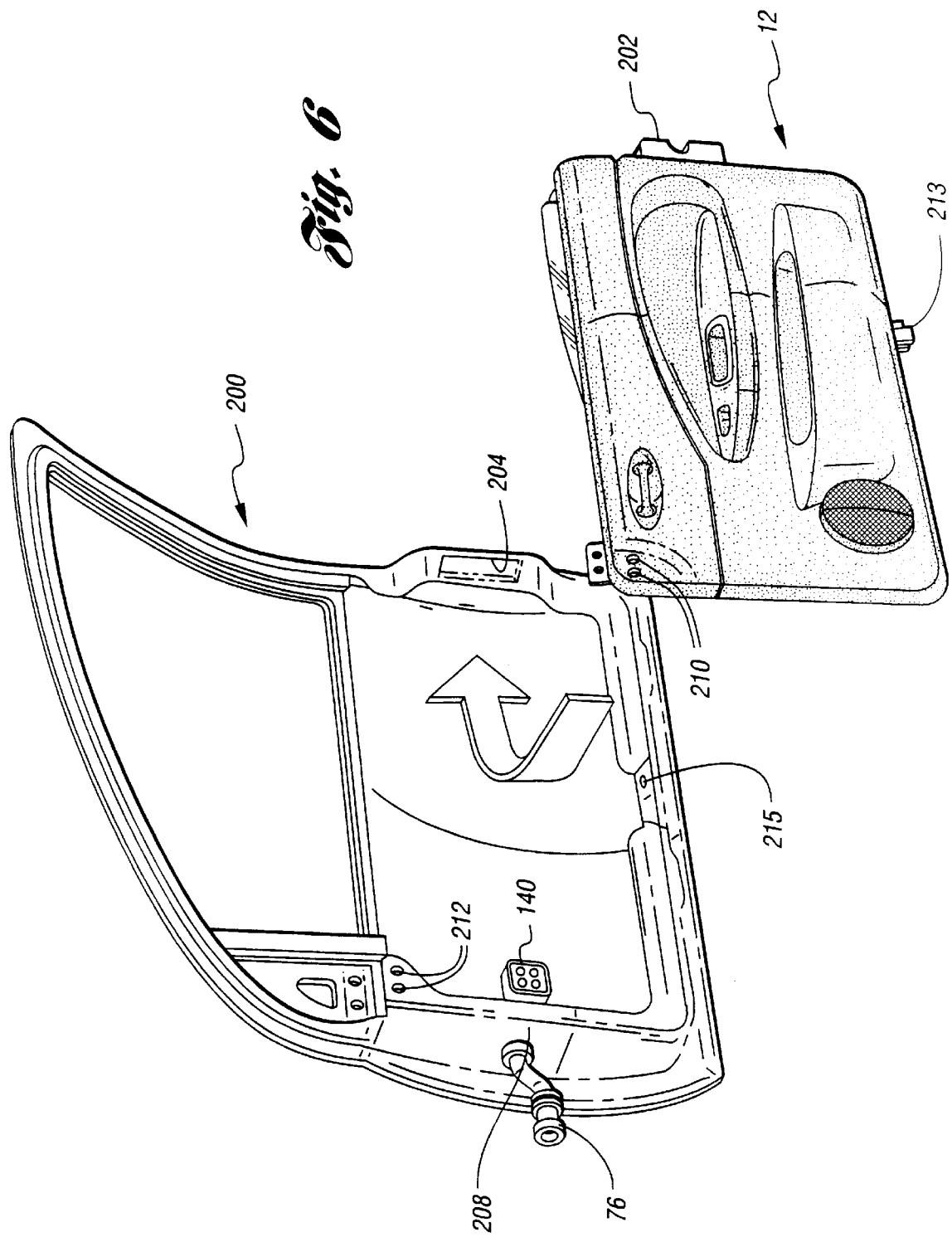
FIG. 6 is a perspective view of the door assembly showing a method of attachment to a door outer panel.

A male section 72 of a self-aligning and/or self-docking electrical connector may be mounted proximate the hinge side of the door panel 12 shown in FIG. 1. FIG. 5 shows the electrical connector comprised of the male section 72 mounted to the door panel 12 and a female section 140 mounted on a door outer panel 200. The male section 72 consists preferably of four spring-loaded contacts 142 having semi-spherical surfaces 143 located in a mounting plate 144 within a box 120. The female section 140 consists of the same number of inverted semi-spherical or crown shaped receptors 146. The receptors 146 can be made of beryllium copper alloy (BeCo) or other suitable material, and can be connected to a traditional electrical connector in the body of the motor vehicle. During assembly, the installer simply translates the box 120 relative to the adjacent female section 140 until correctly positioned. At this point, the contacts 142 automatically fall into the receptors 146, thereby facilitating an electrical connection. A locator pin (not shown) can be provided in addition to the spherical contacts 142. The connector 72 shown in FIG. 1 can be mated with an electrical extension 76 shown in FIG. 4 as part of the door panel 12, or alternatively the extension 76 can be separately provided as part of a sheet metal door exterior for connection to the connector 72 as shown in FIG. 6. Further details of the connector 72 can be found in U.S. patent application filed Aug. 28, 1996 and titled Self-Aligning and Self-Docking Electrical Connector, assigned to the assignee of the present invention and hereby incorporated by reference. Instead of the electrical connector section 72, the harness 58 may be provided with a conventional pass through 78 including a seal 66 integral with the harness at the door-to-body pass through point to inhibit water seepage into the door cavity, as shown in FIG. 2.

The assembled door assembly 10 is adapted for joining with the sheet metal door exterior by bringing it adjacent the door exterior, and locating the electrical connector section 72 with its mating section if so provided of the door exterior. The door assembly 10 is attached to the door exterior at the belt line with either a plurality of bolts or screws, or by separate plastic fasteners or fasteners integrally molded with the door panel, and finally securing the door assembly 10 around its periphery. One significant advantage of the door panel of the present invention, however, is that its electrical components can be tested prior to assembly with the door outer panel.

The assembly sequence for the structural door of the present invention is as follows. First, the base door panel 12 is placed on a conveyor for off line assembly, and the water management provisions are added. The belt line reinforcement is then attached to the base door panel, if not already formed as an integral part thereof. The door side impact components are then attached, after which the door inner handle is slid into place and secured and the lock subassembly is secured with the three screws. The electrical wire harness is then positioned, and the connectors are attached to positions near their respective components. The lock electrical attachment is then completed. The door regulator is then positioned and snapped, screwed or bolted into place, the cables routed and the guide secured and the electrical connection made. Next, the left and right door glass edge guides are positioned and secured at the top and bottom, and the door glass seals are attached into the guides.

The speaker is then snapped or screwed into the door panel, and the grille cover snapped over the speaker and the electrical connection completed. The exterior handle adapter subassembly/theft prevention bracket is then attached and the rods for lock release are attached to the lock. The belt line glass seal is next pushed onto the belt line flange. The door glass is then located in the glass edge seals and located to the regulator guide and secured with the fasteners. Finally, the mirror is installed using three studs with the mirror and attaching three nuts and a foam seal. A power or mechanical mirror cable is routed and connected, if necessary.

An alternative assembly sequence is to first snap fit the interior handle bezel 30 onto the base door panel 12, and then fasten the map pocket on the base door panel. Next, the base door panel is rotated 180 degrees so that the back side 22 faces upwardly, and the map pocket is glued, screwed or ultrasonically or vibrationally welded in place. The base door panel is then unloaded from the conveyor and placed in a vertical orientation, and the belt line reinforcement is added. Contemporaneously or immediately thereafter, the speaker, speaker grille, foam and wire harness are added. After the wire harness is routed, the interior handle lock cable 38 is added. The electrical connections are then made, and the glass run channels added. The window regulator is then positioned and electrically connected. A pull cup is snapped into the door panel arm rest, and any necessary electrical connections such as for power windows are made. Finally, the window glass is added and connected to the regulator.

FIG. 6 shows one alternative for attaching the door panel 12 to the door outer panel 200. As shown by the arrow, a latch housing 202 of the door panel 12 is first inserted through an opening 204 in the door outer panel 200, and the female electrical connector 140 is aligned with the male connector on the door panel 12. To partially secure the door panel 12 to the outer panel 200, a series of bolts or other fasteners are then inserted through horizontally-aligned holes 210 and 212 in the door panel 12 and outer panel 200, respectively. A bottom portion 213 of the window regulator guide extending generally below the periphery of the door panel 12 may be seated in an indentation 215 formed in the door outer panel to assist locating the panels relative to each other.

Figure 7:
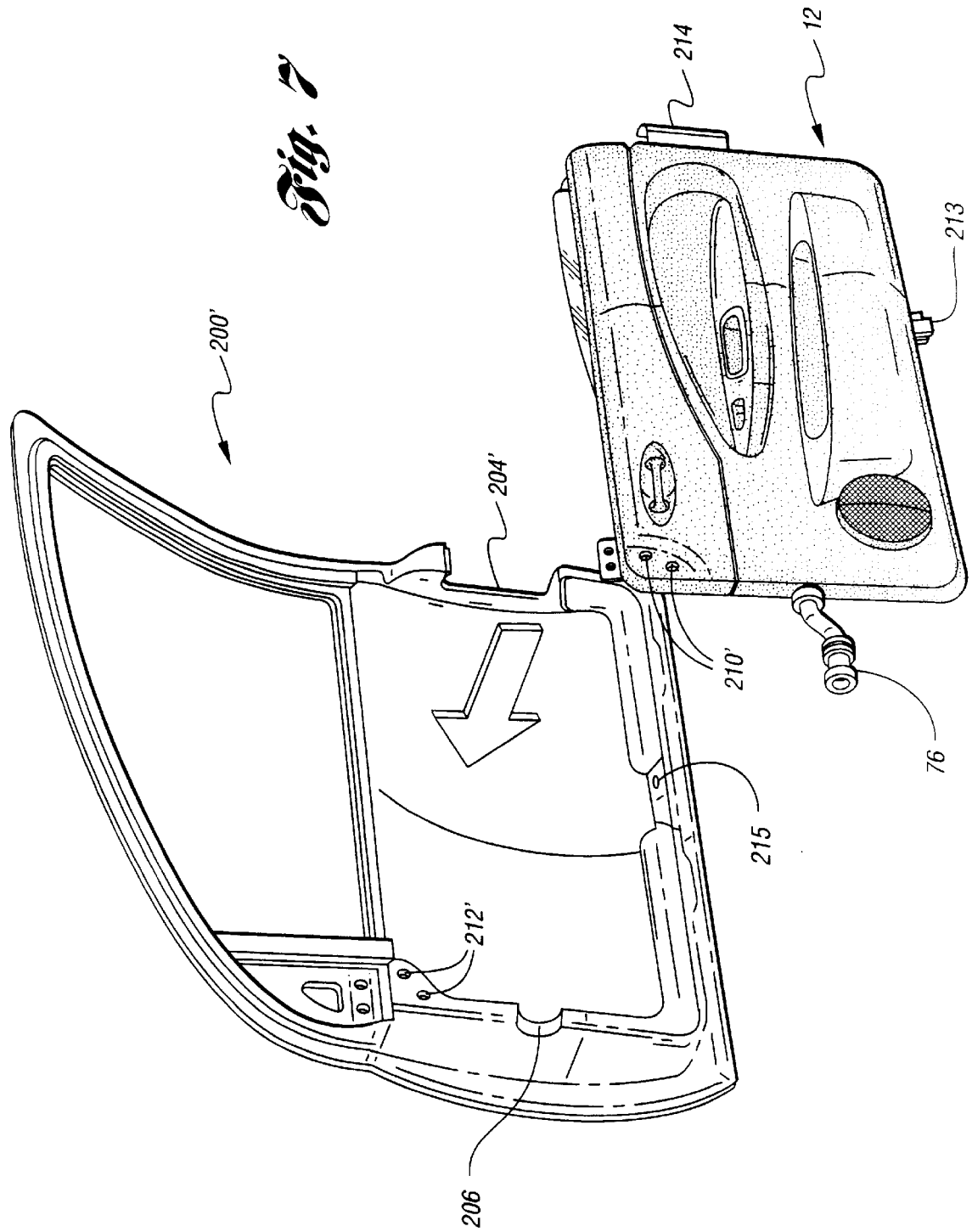
FIG. 7 is a perspective view of an alternative embodiment of the door assembly showing an alternative method of attachment to the door outer panel.

FIG. 7 shows another alternative for mounting the door panel 12 to an outer panel 200'. As shown by the arrow, the door panel 12 is inserted straight into the door outer panel 200' such that a latch flange 214 fits into a notch 204' formed in the outer panel and the electrical extension 76 aligns with notch 206. Diagonally-aligned mounting holes 210' and 212' are provided in the panels 12 and 200', respectively, and thereafter the panels are secured together as described above. The window regulator guide portion 213 may again be seated in the indentation 215 to assist this loading.

Figure 17:
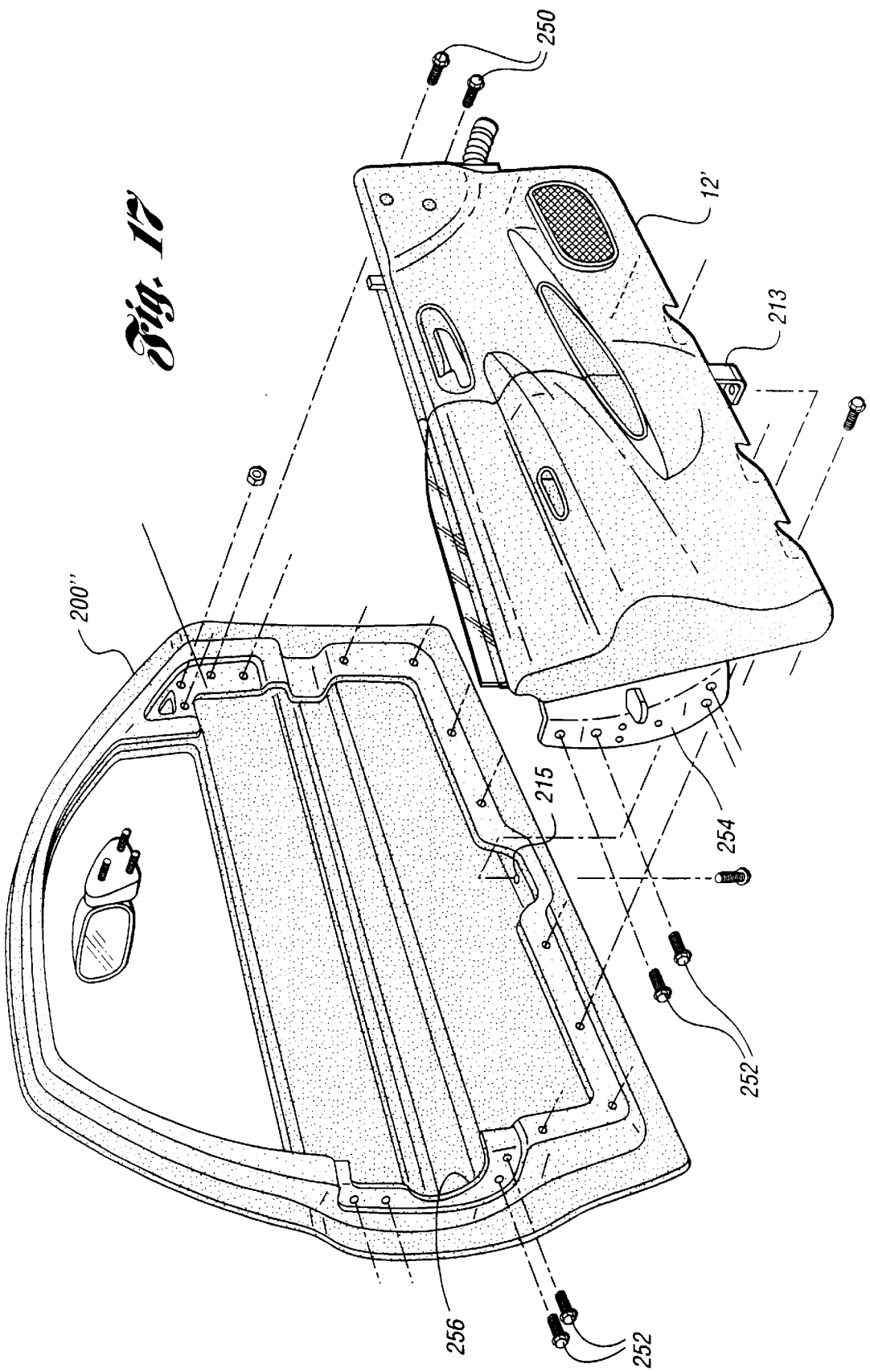
FIG. 17 is a perspective view similar to FIG. 6 and 7 and showing an alternative method of attaching the door trim panel to the door outer panel.

FIG. 17 shows another alternative build in which a door panel 12' is located by the portion 213 cooperating with indentation 215 in outer panel 200". The door panel 12' is then secured with fasteners including screws 250 inserted generally normally to the plane defined by the door panel 12' and screws 252 inserted generally parallel to the plane of the door panel through flange 254 and into a portion 256 of the door outer panel.

Figure 8:
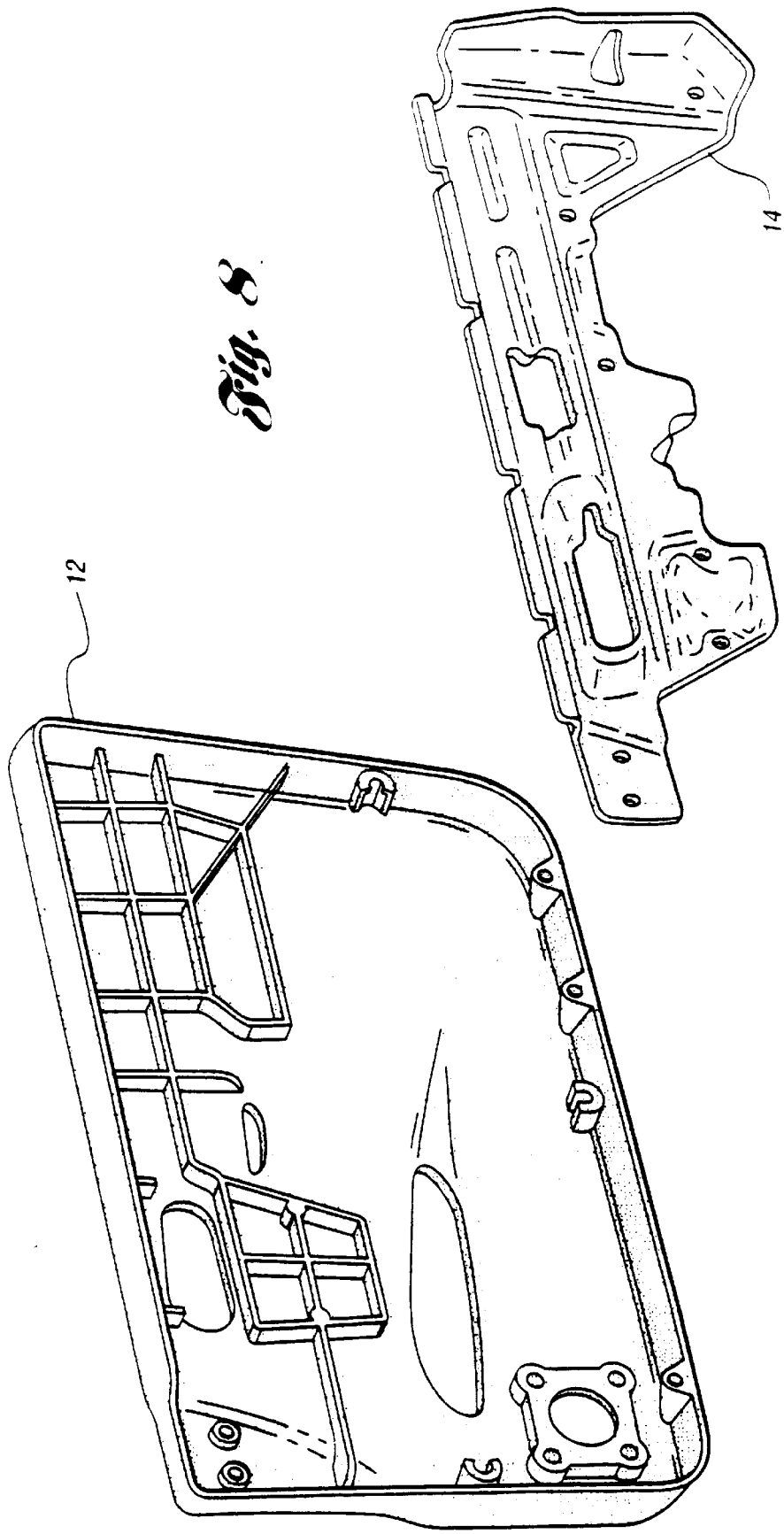
FIG. 8 is a perspective view of an injection molded door trim panel and a belt line reinforcement prior to assembly of any components to the door trim panel.
Figure 9:
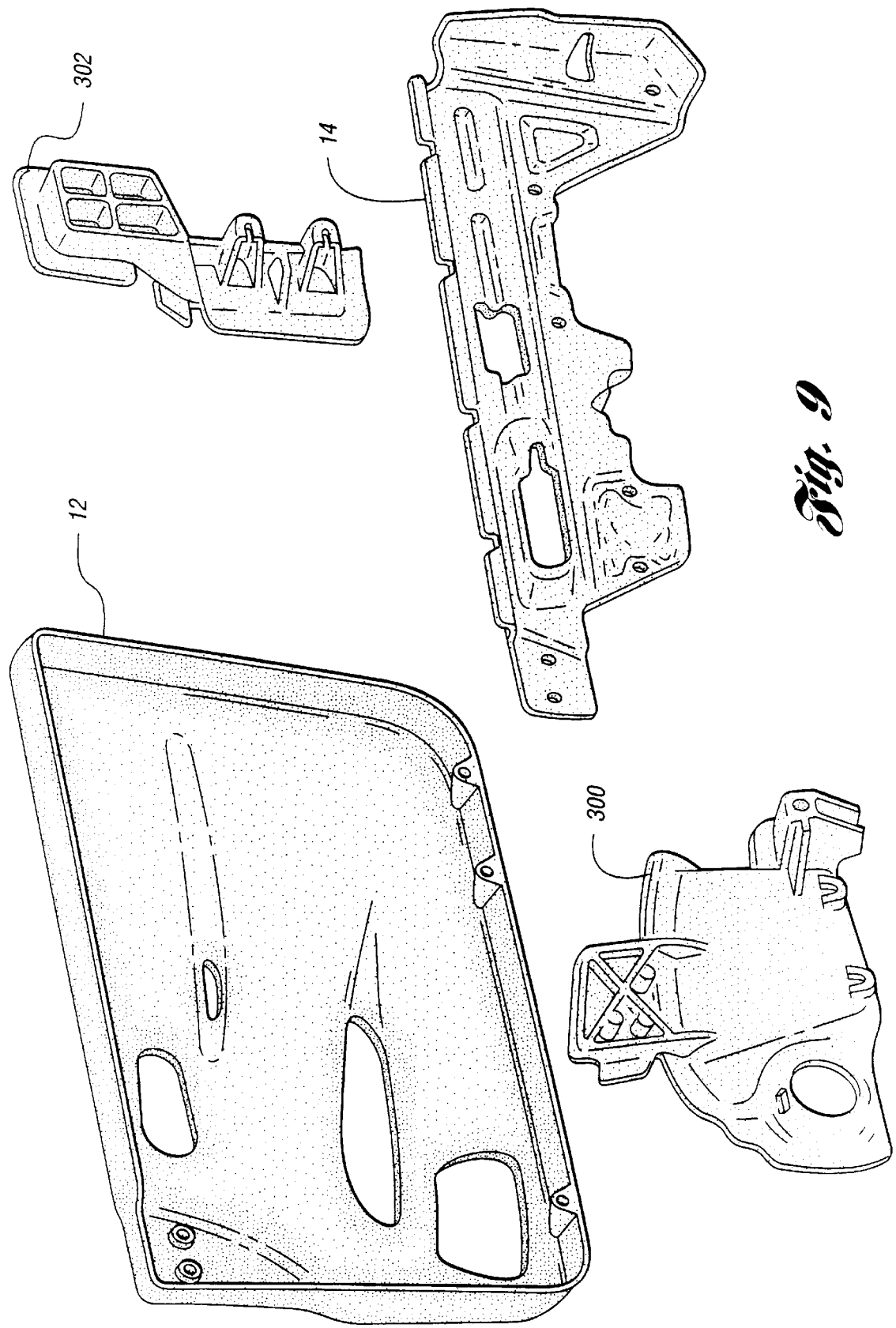
FIG. 9 is a perspective view of a compression molded door trim panel, a belt line reinforcement, a latch reinforcement and a speaker reinforcement prior to assembly of any components to the door trim panel.
Figure 10:
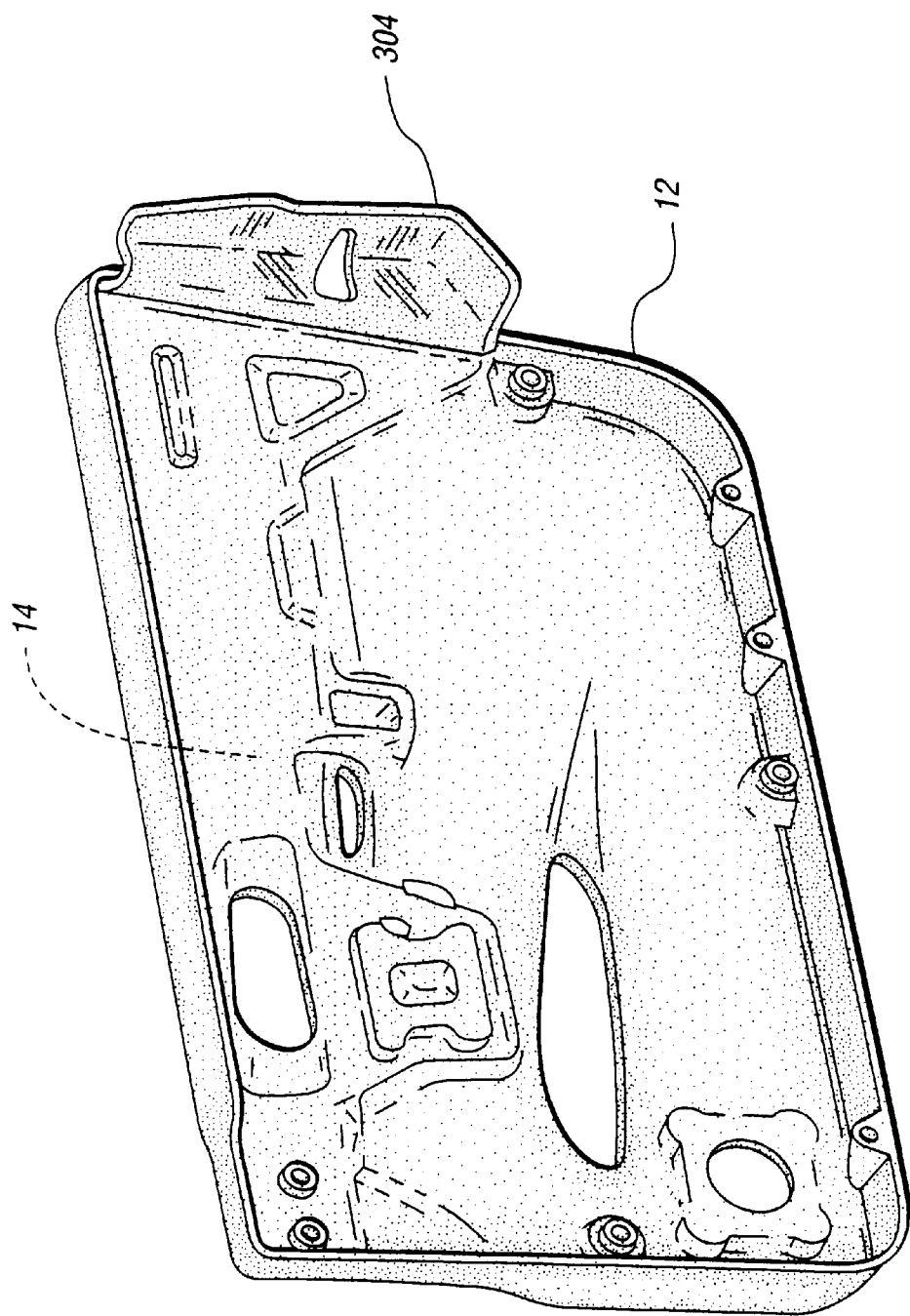
FIG. 10 is a perspective view of a glass reinforced urethane door trim panel and a molded-in belt line reinforcement.

The base door panel 12 is either injection molded, compression molded or formed of a glass-reinforced urethane (GRU). FIGS. 8, 9 and 10 show the back side of alternate door panels 12 formed respectively by each of these methods. In FIG. 9, a combination speaker reinforcement and map pocket 300 and a latch reinforcement 302, both preferably injection molded, are provided. In the GRU door trim panel of FIG. 10, the belt line reinforcement 14 is molded in so that only a flange 304 is exposed.

Figure 11:
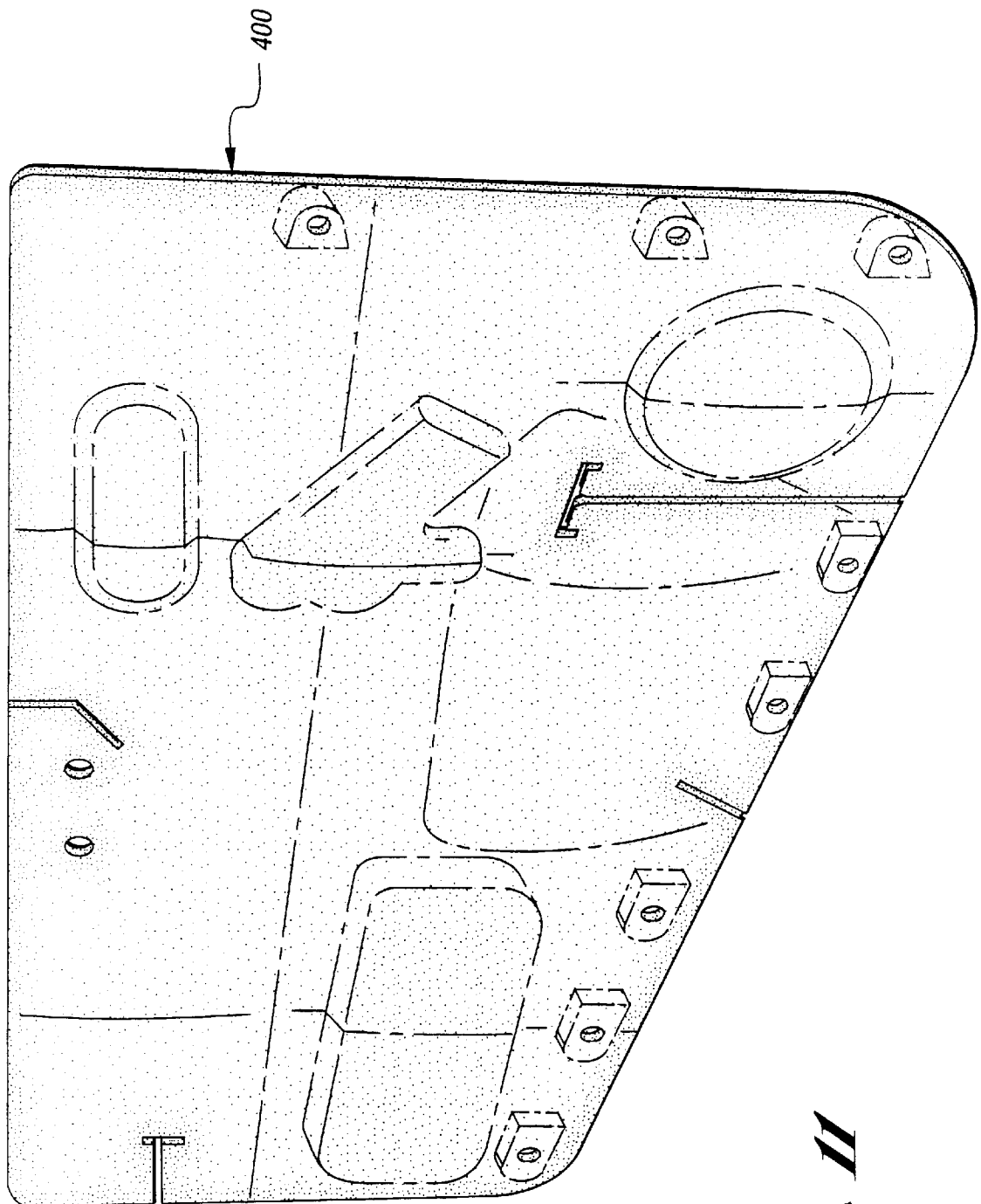
FIG. 11 is a perspective view of a closed cell foam watershield for use with the door assembly.
Figure 12:
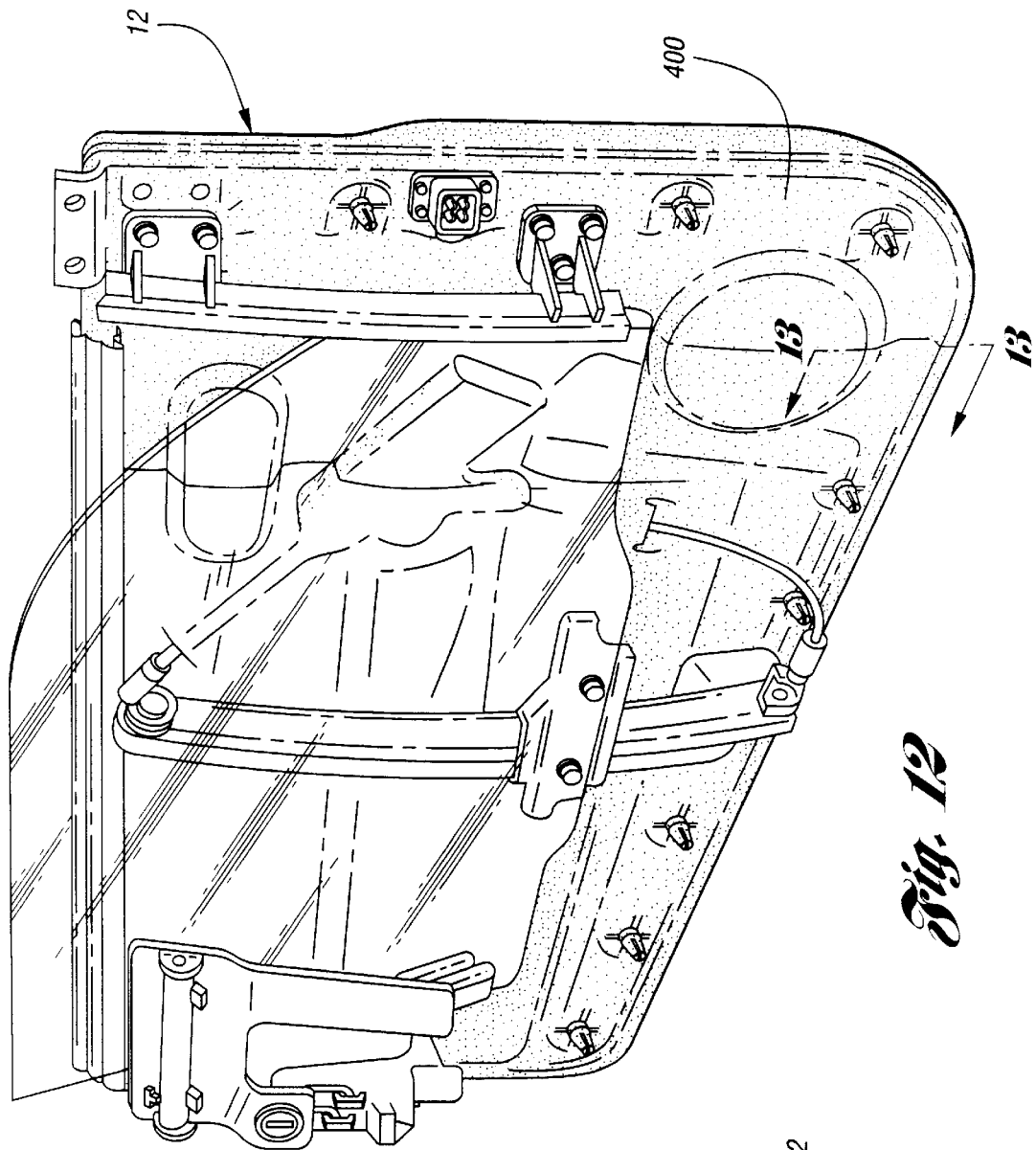
FIG. 12 is a perspective view of an alternative embodiment of the door assembly with the watershield in place.
Figure 13:
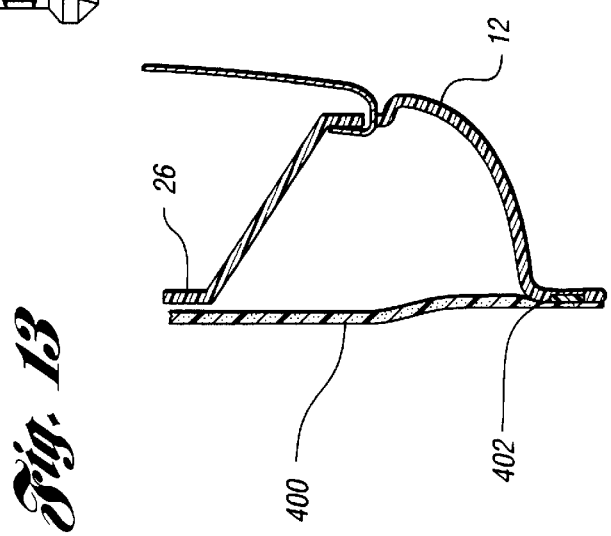
FIG. 13 is a cross-sectional view taken along line 13—13 in FIG. 12.

FIG. 11 shows a watershield 400 for use with the door assembly of the present invention. The watershield 400 is preferably formed from a polyethylene, polyurethane or a closed cell foam, and is sealed, as least in part by means such as an adhesive bead 402, over certain of the door panel components as shown in FIGS. 12 and 13.

It should be understood that while the forms of the invention shown and described above constitute preferred embodiments of the invention, they are not intended to illustrate all possible forms thereof. It should also be understood that the words used are words of description rather than limitation, and various changes may be made without departing from the spirit and scope of the invention disclosed.

What is claimed is:

1. A structural door trim module for combining with and reinforcing an outer door panel of a motor vehicle to make a vehicle door assembly, the door trim module comprising:
   an inner door panel having an inner appearance side and an outer side having a structural characteristic, the inner appearance side being adapted to face into a passenger compartment of the motor vehicle and the outer side being adapted to face the outer door panel;
   an inner door panel reinforcement mounted on the outer side of the inner door panel to provide the structural characteristic and having spaced portions adapted to interface with the outer door panel in respective spaced locations with each spaced portion being readily accessible and operable to detachably and structurally secure the inner door panel in an easy-on, easy-off combination with the outer door panel; and
   a lock mounted on the outer side of the inner door panel for selectively locking and unlocking the outer door panel with respect to the motor vehicle when the inner door panel is secured in combination with the outer door panel, said lock being sufficiently adjacent to one of said spaced portions of said inner door panel reinforcement that said lock is readily accessible and operable to detachably and structurally secure said lock in combination with the outer door panel in one of said spaced locations when the inner door panel is secured in combination with the outer door panel.

2. The structural door trim module of claim 1 wherein said spaced locations are on opposite sides of said inner door panel so that said spaced portions of said inner door reinforcement are more readily accessible when securing the inner door panel in combination with the outer door panel.

3. The structural door trim- module of claim 1 wherein one of said spaced portions of said inner door panel reinforcement is configured substantially normal to said inner door panel adjacent said lock to cause said one of said spaced portions in one of said spaced locations to interface with a peripheral portion of the outer door panel when both the inner door panel and the lock are secured in combination with the outer door panel.

4. The structural door trim module of claim 1 including a window pane frame and a window pane regulator affixed to said inner door panel reinforcement and operable to move said window pane in and out of said window pane frame.

5. The structural door trim module of claim 1 wherein said inner door panel reinforcement is configured to resist crash loads impacting the motor vehicle.

6. The structural door trim module of claim 1 wherein said inner door panel reinforcement is configured to form a door pull support when the inner door panel is secured in combination with the outer door panel.

7. The structural door trim module of claim 1 including a door handle connected to said lock and an interior door handle recess on said inner door panel reinforcement between said spaced portions for receiving said door handle on said inner appearance said of said inner door panel to provide reinforcement for said door handle when said inner door panel is secured in combination with the outer door panel.

8. The structural door trim module of claim 1 including a water management system covering the outer side of said inner door panel to inhibit the introduction of water, noise and dust into the passenger compartment.

9. The structural door trim module of claim 8 including a flange on the inner door panel reinforcement and a belt line glass seal attached to said flange as part of said water management system.

10. The structural door trim module of claim 8 including electrical devices on said outer side of said inner door panel, and wherein said water management system is a sheet configured to conformingly seal said electrical devices.

11. A door assembly for a motor vehicle including a door outer panel having an opening, the door assembly comprising:
   a door trim panel having an inner surface and an outer surface, the inner surface being adapted to face into a passenger compartment of the motor vehicle, the door trim panel being insertable into the opening;
   a catch mounted on the outer surface of the door panel and operable to detachably secure the door assembly in a closed position; and
   a lock mounted on the outer surface of the door panel and engaged with the catch to permit selective operation of the catch.

12. A structural door trim module for combining with and reinforcing an outer door panel of a motor vehicle to make a vehicle door assembly, the door trim module comprising:
   an inner door panel having an inner appearance side and an outer side having a structural characteristic, the inner appearance side being adapted to face into a passenger compartment of the motor vehicle and the outer side being adapted to face the outer door panel;
   an inner door panel reinforcement mounted on the outer side of the inner door panel to provide the structural characteristic and having spaced portions adapted to interface with the outer door panel in respective spaced locations with each spaced portion being readily accessible and operable to detachably and structurally secure the inner door panel in an easy-on, easy-off combination with the outer door panel; and
   a window pane frame and a window pane regulator affixed to said inner door panel reinforcement and operable to move said window pane in and out of said window pane frame.

13. A structural door trim module for combining with and reinforcing an outer door panel of a motor vehicle to make a vehicle door assembly, the door trim module comprising:
   an inner door panel having an inner appearance side and an outer side having a structural characteristic, the inner appearance side being adapted to face into a passenger compartment of the motor vehicle and the outer side being adapted to face the outer door panel;
   an inner door panel reinforcement mounted on the outer side of the inner door panel to provide the structural characteristic and having spaced portions adapted to interface with the outer door panel in respective spaced locations with each spaced portion being readily accessible and operable to detachably and structurally secure the inner door panel in an easy-on, easy-off combination with the outer door panel; and
   a lock mounted on said inner door panel reinforcement and having a handle for operating said lock, said handle adapted to extend into an exterior hand grab position through the outer door panel when said inner door panel is secured in combination with the outer door panel.

\* \* \* \* \*